(12) United States Patent
Hasert et al.

(10) Patent No.: US 11,267,420 B2
(45) Date of Patent: Mar. 8, 2022

(54) METHOD AND DEVICE FOR DETECTING A COLLISION AND DELIMITING IT WITH RESPECT TO NORMAL VEHICLE OPERATION

(71) Applicant: Robert Bosch GmbH, Stuttgart (DE)

(72) Inventors: Matthias Hasert, Ludwigsburg (DE); Andreas Westendorf, Hildesheim (DE); Anne-Helene Kindsvater, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 16/461,291

(22) PCT Filed: Sep. 22, 2017

(86) PCT No.: PCT/EP2017/074002
§ 371 (c)(1),
(2) Date: May 15, 2019

(87) PCT Pub. No.: WO2018/091175
PCT Pub. Date: May 24, 2018

(65) Prior Publication Data
US 2020/0055477 A1 Feb. 20, 2020

(30) Foreign Application Priority Data
Nov. 16, 2016 (DE) ...................... 10 2016 222 490.5

(51) Int. Cl.
*B60R 21/0132* (2006.01)
*B60R 21/0134* (2006.01)
*B60R 21/0136* (2006.01)

(52) U.S. Cl.
CPC ...... *B60R 21/0132* (2013.01); *B60R 21/0134* (2013.01); *B60R 21/0136* (2013.01); *B60R 2021/01322* (2013.01)

(58) Field of Classification Search
CPC ............ B60R 21/0132; B60R 21/0134; B60R 21/036; B60R 2021/01293;
(Continued)

(56) References Cited

U.S. PATENT DOCUMENTS

2004/0000992 A1   1/2004  Cuddihy et al.
2012/0221276 A1   8/2012  Schmidt et al.
(Continued)

FOREIGN PATENT DOCUMENTS

CN   102167041 A   8/2011
CN   102652078 A   8/2012
(Continued)

OTHER PUBLICATIONS

International Search Report for PCT/EP2017/074002, dated Jan. 2, 2018.

*Primary Examiner* — Anthony R Jimenez
(74) *Attorney, Agent, or Firm* — Norton Rose Fulbright US LLP; Gerard Messina

(57) ABSTRACT

A method for detecting a collision of a vehicle, using a measuring device rigidly connected to the vehicle, including the following features: —in each instance, an acceleration of the measuring device with regard to a plurality of device coordinate axes specific to the measuring device is measured; in each instance, an installation position angle of the measuring device with respect to a plurality of vehicle coordinate axes specific to the vehicle is calculated and/or measured and/or programmed from outside; with the aid of the installation position angles, a vehicle acceleration along the vehicle coordinate axes is ascertained, and an evaluation of the accelerations is undertaken; and the degree of determination of the installation position is ascertained by the (Continued)

device and taken into consideration for weighting the accelerations. the collision is detected in light of the evaluation of the vehicle acceleration.

11 Claims, 3 Drawing Sheets

(58) Field of Classification Search
CPC . B60R 2021/01322; B60R 2021/0027; H04W 4/90; G07C 5/008; G07C 5/085; G07C 5/0808; G08B 25/016; G08B 25/08; G08G 1/205; B60W 20/00; B60W 30/00; B60W 30/08; B60W 40/10; B60W 40/12; B60W 2550/00; B60W 2550/40; G01P 21/00; G01P 1/00; G01P 1/04; G01P 1/08; G01P 3/00; G01P 3/02; G01P 3/42; G01P 13/00; G01P 13/02; G01P 13/04; G01P 13/045; G01P 15/00; G01P 15/001; G01P 15/032; G01P 15/165; G01P 15/18

USPC ............................................. 701/45; 702/141
See application file for complete search history.

(56) References Cited

U.S. PATENT DOCUMENTS

| | | | | |
|---|---|---|---|---|
| 2013/0332105 | A1* | 12/2013 | McKown | ............... G01P 21/00 |
| | | | | 702/141 |
| 2014/0379222 | A1* | 12/2014 | Rittler | ............... B60R 21/0132 |
| | | | | 701/45 |

FOREIGN PATENT DOCUMENTS

| | | |
|---|---|---|
| DE | 10138764 C1 | 10/2002 |
| DE | 102011113196 A1 | 3/2013 |
| EP | 2487659 A1 | 8/2012 |
| WO | 2009068983 A2 | 6/2009 |
| WO | 2013096908 A1 | 6/2013 |

\* cited by examiner

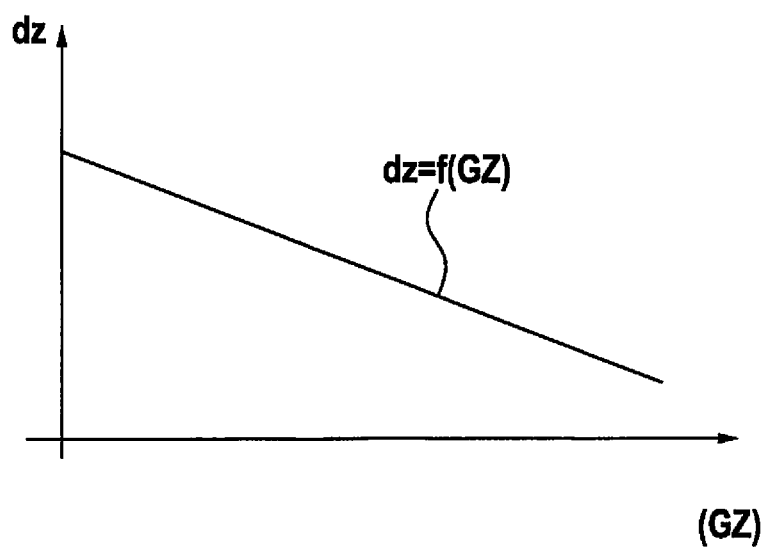

METHOD AND DEVICE FOR DETECTING A COLLISION AND DELIMITING IT WITH RESPECT TO NORMAL VEHICLE OPERATION

FIELD

The present invention relates to a method for detecting a collision. In addition, the present invention relates to a corresponding telematics unit, as well as to a corresponding computer program, storage medium and vehicle.

BACKGROUND INFORMATION

So-called crash or impact sensors, which are used in motor vehicles in order to detect various collisions of the vehicle in question, are sufficiently well-known in the area of vehicle safety. For example, in response to a considerable shock, a stationary-mounted measuring device transmits an electrical impulse via the bus of the specific vehicle, to various other control units, which are able, in turn, to activate different occupant protection systems. To this end, depending on the level of standard equipment, these may include, for instance, airbags, seat-belt force limiters, belt tensioners and roll bars of the vehicle. In this context, crash sensors of a simple type of construction detect only the damaging event, as such, and activate the above-mentioned occupant protection systems as soon as a predefined threshold value of the vehicle deceleration is exceeded, while more progressive measuring devices are also able to detect the severity of the impact.

The related art also includes stationary-mounted or retrofittable telematics units for motor vehicles, which include such sensor technology and automatically transmit, for example, to a vehicle fleet operator or vehicle fleet.

For example, German Patent Application No. DE 10138764 describes a set-up for detecting a head-on collision in a vehicle, where at least one upfront sensor is used as plausibility sensor, which supplies a plausibility signal for a crash sensor located in the control unit. The upfront sensor is an acceleration sensor, which checks both the acceleration signal and the speed signal derived from it for plausibility. The results of this check are linked in an OR-operation, in order to generate a plausibility signal. In one further refinement, it is provided that the plausibility signal be stored in the control unit for a predetermined time. This is of interest, in particular, for increasing a margin of safety in the event that the upfront sensor has been destroyed.

SUMMARY

The present invention provides a method for detecting a collision of a vehicle, a corresponding telematics unit, as well as a corresponding computer program, storage medium and vehicle.

In this connection, the approach of the present invention is based on the realization that in the case of conventional measuring devices, the acceleration values with respect to the device coordinate axes are evaluated mostly without regard to the installation position of the device. However, one specific embodiment of the present invention considers three aspects: first, during operation of a road vehicle, marked accelerations, which are caused by potholes, occasionally occur in its yaw, normal or vertical axis (z). Secondly, with regard to driving dynamics, serious accidents typically take place in the plane (x-y) spanned by the roll or longitudinal axis (x) and the pitch or transverse axis (y) of the vehicle. Thirdly and finally, collisions in the lateral region of the vehicle, which are characterized by an acceleration along the pitch axis, are particularly dangerous for its occupants.

Accordingly, one advantage of the telematics unit in accordance with the present invention already lies in the advantageous detection and evaluation of vehicle-specific accelerations in the case of rough position detection of the telematics unit. In this manner, one preferred specific embodiment of the present invention allows it to detect crashes without being connected to the vehicle bus system.

Thus, a telematics unit of the present invention allows the acceleration values to be evaluated accurately without the exact position of the unit having to be known beforehand via information on this matter on the part of its operator, or without a software input by the operator and/or manufacturer having to take place.

If an accident is detected by a telematics unit of the present invention, then, for example, an emergency call may be sent by the telematics unit. To that end, the telematics unit includes a communications device for contacting an emergency service center. The communications unit may be connected to an emergency service center via a wireless connection in the form a stationary processing unit (computer) or mobile processing unit (e.g., cellular phone, tablet). In this case, the exchange of data with the emergency service center takes place, for example, via WLAN, wireless mobile radio communication technology, or Bluetooth. The telematics unit detects an accident, if a collision is identified in light of the evaluation of the vehicle acceleration.

Advantageous further refinements of and improvements to the root idea of the present invention are made possible by the measures described herein. Thus, it may be provided that the weighting of the acceleration correlate with the quality of the installation position. This embodiment allows the telematics unit to distinguish more effectively between crash events and other disturbances, such as potholes, independently of the position and installation location in the vehicle; the potholes being encountered, for example, during dynamic travel over a rough road.

For example, in response to a considerable shock, a stationary-mounted measuring device transmits an electrical impulse via the bus of the specific vehicle, to various other control units, which are able, in turn, to activate different occupant protection systems.

According to one further aspect, the weighting of the acceleration along the transverse axis may also be applied as a function of the quality of the position. Such a specific embodiment allows the potential danger to occupants to be estimated more effectively, independently of the position and the installation location in the vehicle.

BRIEF DESCRIPTION OF THE DRAWINGS

Exemplary embodiments of the present invention are represented in the figures and explained in greater detail in the following description.

FIG. 3 shows a graph of a function.

DETAILED DESCRIPTION OF EXAMPLE EMBODIMENTS

Figure 1:
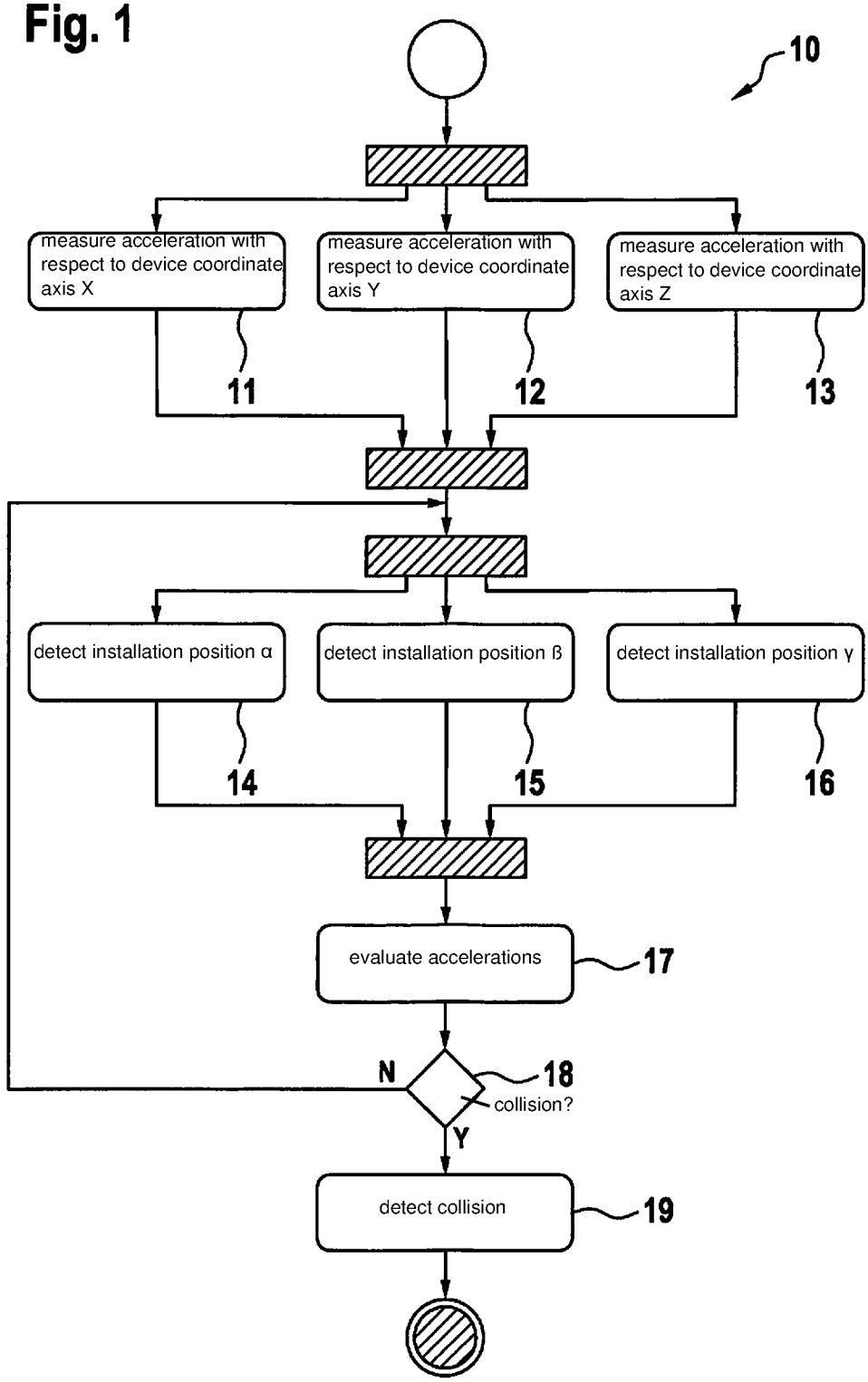
FIG. 1 shows the activity diagram of a method according to a first specific embodiment of the present invention.
Figure 2:
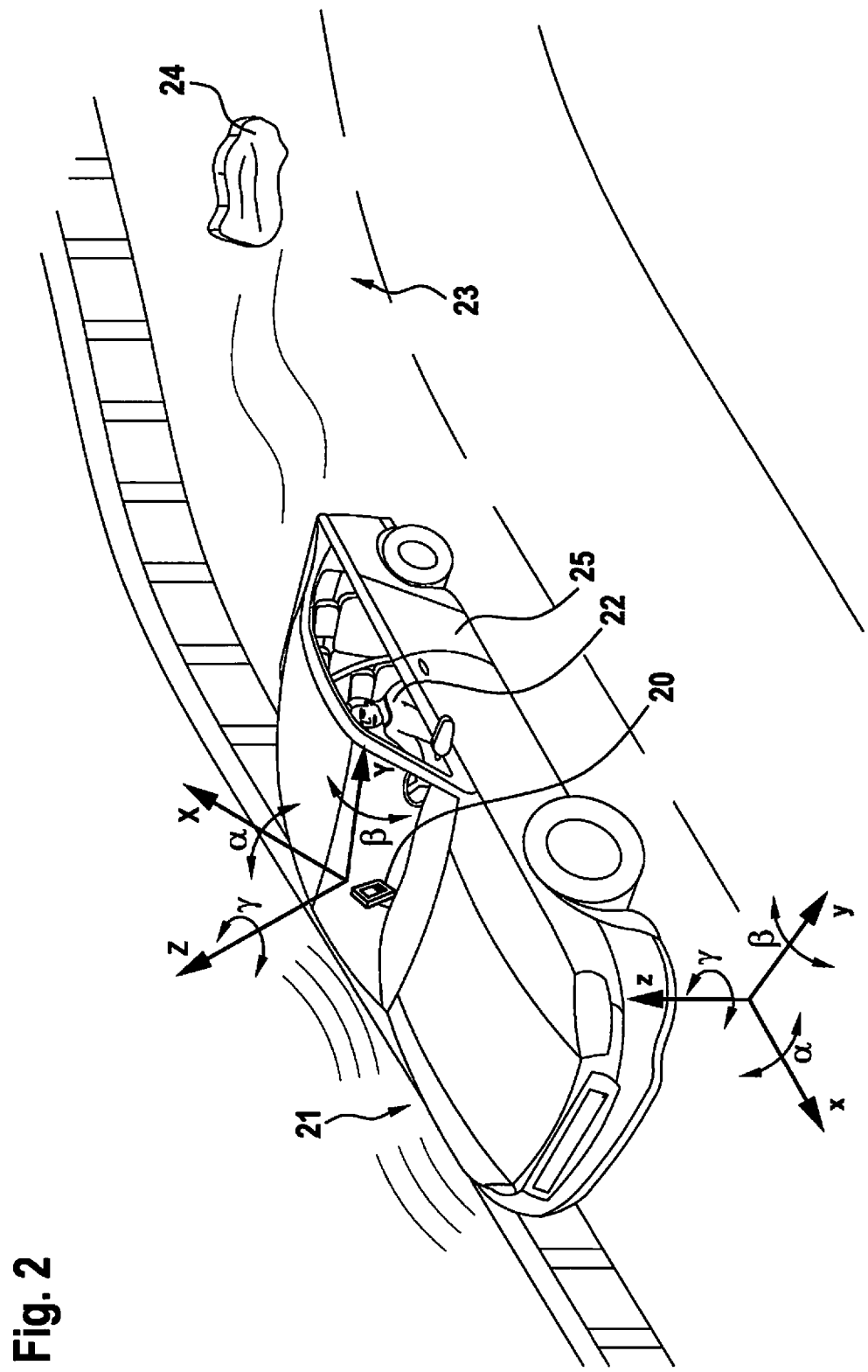
FIG. 2 shows the perspective view of a road vehicle according to a second specific embodiment.

FIG. 1 illustrates the basic steps of a method 10 of the present invention for collision detection in a vehicle 25; the steps now being explained in light of the application case depicted in FIG. 2. In this case, method 10 is executed by a retrofitted telematics unit 20 of vehicle 25 without a connection to its bus system, which is not shown graphically. However, a corresponding method 10 may also be implemented in a stationary-mounted control unit or other measuring device (20), for example, by software or hardware or a mixture of software and hardware, without departing from the scope of the present invention.

To this end, telematics unit 20 periodically measures its acceleration with respect to its own device coordinate axes (X, Y, Z) in an initially conventional manner (actions 11, 12, 13). Appropriate detecting elements in the form of acceleration sensors, accelerometers, or G-sensors are familiar to one skilled in the art. In addition, telematics unit (20) detects its installation position (actions 14, 15, 16). Integrated gyroscope and acceleration sensors suitable for this purpose may be implemented, for example, in the form of microelectromechanical systems (MEMS). In this connection, the degree of determination of the installation position of device coordinates (X, Y, Z) with respect to vehicle coordinate system (x, y, z) determines, so to speak, the quality of the installation position, with the aid of which the sensitivity or responsivity of unit (20) to particular acceleration components may be adjusted. Consequently, the installation position angles ($\alpha$, $\beta$, $\gamma$) determined in accordance with FIG. 2 constitute the relationship between device coordinates and vehicle coordinates.

Telematics unit 20 is now able to undertake a sophisticated evaluation of the accelerations as a function of the quality of the installation position (action 17). If a certain quality of the installation position (determined by quality coefficient GZ) is attained, then the weighting "takes effect" and effects a reduction or gain in the acceleration used as an input variable. Thus, there is the option of setting the weighting as a function of quality coefficient GZ.

To this end, telematics unit 20 ascertains the acceleration along each of the device coordinate axes (X, Y, Z) and relates them to vehicle coordinates (x, y, z) on the basis of the ascertained installation position angle. The weighting on the basis of quality coefficient GZ is then applied to the specific vehicle acceleration, which is then subsequently evaluated, using an algorithm. If, for example, unit (20) is mounted in vehicle 25 in a nearly upright position, then its vertical axis Z substantially corresponds to yaw axis z of vehicle 25; the two axes Z, z are at a comparatively small angle $\gamma$ to each other. Therefore, since a Z-acceleration of telematics unit 20 is typically caused by potholes 24 or other irregularities of roadway 23, unit 20 henceforth reduces the weighting of this component and consequently "damps" its influence on the evaluation of the situation.

This continuous function $g_Z(GZ)$ may be implemented with respect to a quality coefficient GZ; the quality coefficient being derived from the position determination. The quality coefficient correlates with the effect on the respective acceleration. The more accurately the position of the telematics unit is known, the stronger the affect is on the respective acceleration.

Since the z-axis of the vehicle may be ascertained rapidly from the acceleration due to gravity, this method is particularly suitable for the weighted evaluation of the z-axis of the vehicle. Thus, actual crash events may be distinguished more clearly from other disturbances, such as potholes.

FIG. 3 illustrates an example of the relationship $g(z)=gz*dz$, where $dz=f(GZ)$.

What is claimed is:

1. A method for detecting a collision of a vehicle, using a measuring device stationary-mounted to the vehicle, the method comprising:
   measuring an acceleration of the measuring device for each of a plurality of device coordinate axes specific to the measuring device;
   calculating, and/or measuring and/or programming, without connection to a bus system of the vehicle, an installation position angle of the measuring device for each of a plurality of vehicle coordinate axes specific to the vehicle;
   ascertaining vehicle acceleration along the vehicle coordinate axes using the installation position angle, and evaluating the accelerations;
   ascertaining a degree of determination of an installation position by the device, wherein when a certain quality, as determined by a quality coefficient, of the installation position is attained, then a weighting is provided and effects a reduction or gain in a specific vehicle acceleration used as an input variable, so that the weighting is set as a function of the quality coefficient;
   detecting the collision based on the evaluation of the vehicle acceleration;
   wherein the measuring device includes a telematics unit in the vehicle, and
   wherein the quality coefficient, which correlates with an effect on a respective acceleration, is derived from the determined installation position.

2. The method as recited in claim 1, wherein the accelerations are measured repeatedly.

3. The method as recited in claim 1, wherein the accelerations are measured periodically.

4. The method as recited in claim 1, wherein for each of the device coordinate axes, a weighting of the acceleration along the device coordinate axis is adjusted based on the installation position angle and a quality coefficient, and wherein the accelerations are evaluated as a function of the weightings.

5. The method as recited in claim 4, wherein each of the device coordinate axes is assigned one of the vehicle coordinate axes; and wherein the weighting of the acceleration along each of the vehicle coordinate axes is a continuous function of the installation position angle and a continuous function of the quality coefficient, which is derived from the determined position and which correlates with the effect on the respective acceleration, regarding the vehicle coordinate axis assigned to the device coordinate axis.

6. The method as recited in claim 5, wherein the device coordinate axes include a vertical axis, the vehicle coordinate axes include a yaw axis, and the weighting of the acceleration along the vertical axis correlates with the installation position angle and the quality coefficient, which is derived from the determined position and which correlates with the effect on the respective acceleration, with respect to the yaw axis.

7. The method as recited in claim 5, wherein the device coordinate axes include a transverse axis, the vehicle coordinate axes include a pitch axis, and the weighting of the acceleration along the transverse axis correlates with the installation position angle and the quality coefficient, which is derived from the determined position and which correlates with the effect on the respective acceleration, for the pitch axis.

8. The method as recited in claim 5, wherein the device coordinate axes include a longitudinal axis, the vehicle coordinate axes include a roll axis; and the weighting of the acceleration along the longitudinal axis correlates with the installation position angle and the quality coefficient, which is derived from the determined position and which correlates with the effect on the respective acceleration, with regard to the roll axis.

9. A non-transitory machine-readable storage medium, on which is stored a computer program, which is executable by a processor, comprising:
   a program code arrangement having program code for detecting a collision of a vehicle, using a measuring device stationary-mounted to the vehicle, by performing the following:
      measuring an acceleration of the measuring device for each of a plurality of device coordinate axes specific to the measuring device;
      calculating, and/or measuring and/or programming, without connection to a bus system of the vehicle, an installation position angle of the measuring device for each of a plurality of vehicle coordinate axes specific to the vehicle;
      ascertaining a vehicle acceleration along the vehicle coordinate axes using the installation position angle, and evaluating the accelerations;
      ascertaining a degree of determination of an installation position by the device, wherein when a certain quality, as determined by a quality coefficient, of the installation position is attained, then a weighting is provided and effects a reduction or gain in a specific vehicle acceleration used as an input variable, so that the weighting is set as a function of the quality coefficient;
      detecting the collision based on the evaluation of the vehicle acceleration;
      wherein the measuring device includes a telematics unit in the vehicle, and
      wherein the quality coefficient, which correlates with an effect on a respective acceleration, is derived from the determined installation position.

10. A telematics apparatus for detecting a collision of a vehicle, using a measuring device stationary-mounted to the vehicle, comprising:
   a telematics unit configured to perform the following:
      measuring an acceleration of the measuring device for each of a plurality of device coordinate axes specific to the measuring device;
      calculating and/or measuring and/or programming, without connection to a bus system of the vehicle, an installation position angle of the measuring device for each of a plurality of vehicle coordinate axes specific to the vehicle;
      ascertaining a vehicle acceleration along the vehicle coordinate axes using the installation position angle, and evaluate the accelerations;
      ascertaining a degree of determination of an installation position by the device, wherein when a certain quality, as determined by a quality coefficient, of the installation position is attained, then a weighting is provided and effects a reduction or gain in a specific vehicle acceleration used as an input variable, so that the weighting is set as a function of the quality coefficient;
      detecting the collision based on the evaluation of the vehicle acceleration;
      wherein the measuring device includes a telematics unit in the vehicle, and
      wherein the quality coefficient, which correlates with an effect on a respective acceleration, is derived from the determined installation position.

11. A vehicle comprising:
   a telematics unit for detecting a collision of a vehicle, using a measuring device stationary-mounted to the vehicle, by performing the following:
      measuring, an acceleration of the measuring device for each of a plurality of device coordinate axes specific to the measuring device;
      calculating and/or measuring and/or programming, without connection to a bus system of the vehicle, an installation position angle of the measuring device for each of a plurality of vehicle coordinate axes specific to the vehicle;
      ascertaining a vehicle acceleration along the vehicle coordinate axes using the installation position angle, and evaluate the accelerations;
      ascertaining a degree of determination of an installation position by the device, wherein when a certain quality, as determined by a quality coefficient, of the installation position is attained, then a weighting is provided and effects a reduction or gain in a specific vehicle acceleration used as an input variable, so that the weighting is set as a function of the quality coefficient;
      detecting the collision based on the evaluation of the vehicle acceleration;
      wherein the measuring device includes a telematics unit in the vehicle, and
      wherein the quality coefficient, which correlates with an effect on a respective acceleration, is derived from the determined installation position.

* * * * *